US008747203B1

(12) United States Patent
Hedge, Jr. et al.

(10) Patent No.: US 8,747,203 B1
(45) Date of Patent: Jun. 10, 2014

(54) BLACKJACK / PROPOSITIONS

(76) Inventors: J. Richard Hedge, Jr., Chandler, AZ (US); Aviva R. Hedge, Chandler, AZ (US)

( * ) Notice: Subject to any disclaimer, the term of this patent is extended or adjusted under 35 U.S.C. 154(b) by 637 days.

(21) Appl. No.: 12/930,473

(22) Filed: Jan. 7, 2011

Related U.S. Application Data

(63) Continuation-in-part of application No. 12/798,864, filed on Apr. 13, 2010, now Pat. No. 8,308,540.

(51) Int. Cl.
*A63F 13/00* (2014.01)

(52) U.S. Cl.
USPC .................................. 463/11; 463/12; 463/13

(58) Field of Classification Search
USPC ........... 463/10-13, 25, 29; 273/274, 292, 309
See application file for complete search history.

(56) References Cited

U.S. PATENT DOCUMENTS

| | | | | |
|---|---|---|---|---|
| 5,769,422 | A * | 6/1998 | Stromer | 273/274 |
| 5,788,241 | A * | 8/1998 | Ung | 273/292 |
| 2004/0188934 | A1* | 9/2004 | Rusnak et al. | 273/254 |

OTHER PUBLICATIONS

Practical Casino Math: by Robert C. Hannum & A. N. Cabot Institute for the Study of gambling & Commercial gaming-Reno, NV 89557 ,Copyright (c) 2005 Trace Publications, Second Edition.

Casino Vérité Blackjack: by Norman Wattenberg Q-Fit Books New York, NY 10150 Copyright (c) 2005 Q-Fit Publications, Fifth Edition.

Casino-ology: The Art of Managing Casino Games. By Bill Zender Huntington Press Las Vegas, NV 89103 Copyright (c) 2008 Huntington Press, First Edition.

Quick Draw Blackjack + "Propositions: 20 & 21" A Mathematical Analysis / Prepared for: J. Richard Hedge, Jr.

* cited by examiner

*Primary Examiner* — David L Lewis
*Assistant Examiner* — Eric M Thomas

(57) ABSTRACT

The Applicants are providing a new process for playing Blackjack. The uses of, at least one fifty-two card deck, or modified decks are applied. This process is designed for an programmable gaming apparatus or "live action" table games, as accommodated for. Players, initially play via standardized Blackjack rules for their "Primary & Secondary 'Base' play action(s)," As such, all customarily engaged wagers of variable risk are in play against the Dealer's hand. However, Players can now move into an Alternative bypassing Strategy, and Secondary Decision-Propositions' process, where Proposition wagers are won or lost before the Dealer reveals their "Hole" card! While, its always the outcomes of 20 and 21 to win. This event can be regularly rebooked as an alternate card drawing strategy, or as a Multi-Down wagering event for an instant 20 or 21 win. Also, short-Win, Push and Mercy numbers typically engage the outcomes of: 17, 18 or 19.

13 Claims, 12 Drawing Sheets

COUNSEL I

*HOW TO PLAY:*

Players book their initial "Primary" contract wagers and optional "Ante" wager Side-Bets.

Players are dealt Two (2) cards one at a time, up or down.

Dealers are dealt One (1) card up, and One (1) card, their "Hole" card, is dealt down.

Players may draw card(s) until their best possible hand is made to "Stand Pat" or "Busts."

*BLACKJACK'S PRIMARY & SECONDARY "BASE" PLAY ACTION RULES:*
ALL PLAY ACTIONS ARE PLAYED AND "WON" IN THE TRADITIONAL MANNER.

Players always "Win" on Blackjack! Pays EVEN MONEY.

Players can Double Down on: Any Two (2) cards.

Players can Split any paired cards: Three times for a total of Four Hands.

Players can Double Down on any Split cards: One (1) card to Ten's & Ace's.

Players can "Surrender" for "Half" their contract wager. Any remaining Side-Bets fall to the House.

All hand count tallies *over* Twenty-One (21) are "Busted."

All hand count tallies "Standing Pat" *short* of the Dealer's hand count are "Sacked."

*THE ALTERNATIVE BYPASS; SECONDARY DECISION~PROPOSITION PLAYS:*
ACTIONS BEGIN & END FOR THE PLAYER; "BEFORE" THE DEALER REVEALS THEIR "HOLE" CARD.

Players can Move to Propositions for engaging a "Bypassing Secondary Decision" for their outcome.

Players can Split-hands one-card to play against the Dealer; while Playing the other card in the Propositions.

Players can Triple Down on any: Two-Card Ten (10) or Eleven (11) Counts, even after Splitting in Prop-Box.

Players can Triple Down on any: Ace-Ten "Parlay Blackjack." One (1) card to each new hand.

Players can Triple Down on any: Paired Tens & Aces. One (1) card to each hand.

*SIDE-BETS:*

All first Two (2) card, "Ante" type side-bet wagers are displayed tableside with their "Bonus Payoffs."

All first Three (3) card, "Ante" type side-bet wagers are displayed tableside with their "Bonus Payoffs."

*A DEALER'S HAND IS IN PLAY ACTION*

*PRIMARY "BASE" PLAY ACTION:*
WINNING HANDS, TIE HANDS & STANDING "PAT" AGAINST THE DEALER'S HAND.

*PLAYER'S "WINNING" HAND TALLY'S:*

IF: A Player "Stands Pat" with a hand of: "BLACKJACK."

THEN: The Player always "Wins."

SO: The Players are paid: EVEN MONEY on their "Contract Wager."

*Fig. 6a*

IF: A Player "Stands Pat" with a hand of: TWENTY OR LESS.

THEN: The Player must "Beat" the Dealer's Hand Tally to Win.

SO: If, the Player "Beats" the Dealer's Hand Tally without "Busting" they "Win." If not, they "lose."

*(CONTINUED IN FIG. 6b)*

*PLAYER'S "TIE" HAND TALLY'S: :*

IF: A Player's Hand Tally finishes with the same total as the Dealer's Hand Tally, this is a "TIE."

THEN: The Player's Hand is a "Push / Tie."

SO: The Player doesn't win or lose.

*Fig. 6b*

*PLAYER'S "LOSING" HAND TALLY'S*

IF: A Player's Hand Tally falls short of the Dealer's Hand Tally outcome.

THEN: The Player(s) are "Sacked," and LOSE.

SO: The Player(s) lose: 100% of their *total* contract wager. Player(s) are "Busted" over 21.

*SECONDARY DECISION "BASE" PLAY ACTION:*

DOUBLING DOWN & DOUBLING ON SPLIT CARDS AGAINST THE DEALER'S HAND.

*PLAYER'S "WINNING" HAND TALLY'S:*

IF: A Player "Doubles Down," and their Hand Tally "Beats" the Dealer's Hand Tally.

THEN: The Player(s) "Win."

SO: The Player(s) are paid: EVEN MONEY, on the full wager.

*PLAYER'S "TIE" HAND TALLY'S:*

IF: A Player's Hand Tally finishes with the same total as the Dealer's Hand Tally, this is a "TIE."

THEN: The Player's Hand is a "Push / Tie."

SO: The Players doesn't win or lose.

*PLAYER'S "LOSING" HAND TALLY'S:*

IF: A Player "Doubles Down" and their Hand Tally falls short of the Dealer's Hand Tally outcome.

THEN: The Player(s) are "Sacked," and LOSE.

SO: The Player(s) lose: 100% of their *total* contract wager. Player(s) are "Busted" over 21.

*NO DEALER'S HAND IS IN PLAY*

*SECONDARY DECISION "PROPOSITIONS" PLAY ACTION:*

PARLAYED BLACKJACK'S: 10 OR 11 COUNT HAND(S) AND/OR SPLIT PAIRS, TENS & ACES.

*OPITONAL PROPOSITION "SHORT-WIN" NUMBER IN PLAY ACTION IS: 19*

*OPITONAL PROPOSITION "PUSH" NUMBER IN PLAY ACTION IS: 19*

*OPTIONAL PROPOSITION "MERCY" NUMBER(S) IN PLAY ACTION ARE: 17 & 18*

*PLAYER'S "PARLAY BLACKJACK" HANDS:*

IF: A Player draws Blackjack upon first Two (2) cards.

THEN: Player(s) have option to book new wagers on both Ace & Ten cards within the Propositions.

SO: Player(s) are allowed up to Triple Down for their play action.

*(CONTINUED IN FIG. 6c)*

Fig. 6c

*PLAYER'S "WINNING" HAND TALLY'S:*

IF: A Player draws to an outcome hand of: TWENTY and/or BLACKJACK / TWENTY-ONE.

THEN: The Player(s) are automatic "Winners again."

SO: The Player(s) are paid: EVEN MONEY, on the full wager.

*PLAYER'S OPTIONAL "SHORT-WIN" NUMBER HAND TALLY:*

IF: An optional Short-win number is in play; and player draws to an outcome hand of: NINETEEN.

THEN: The Player(s) hand is a "Short-win."

SO: The Player(s) are paid: LESS than 100% of their full combined contracted wager.

*PLAYER'S OPTIONAL "PUSH" NUMBER HAND TALLY:*

IF: An optional Push number is in play; and player draws to an outcome hand of: NINETEEN.

THEN: The Player(s) hand is a "Push-play."

SO: The Player(s) don't win or lose.

*PLAYER'S OPTIONAL "MERCY" NUMBER(S) AND "LOSING" HAND TALLY'S:*

IF: An optional Mercy number is in play; and player draws to new outcomes of: SEVENTEEN, EIGHTEEN or, EVEN NINETEEN.

THEN: The Player(s) keeps a "Portion" of their Entire Wager at play.

SO: When a Player(s) hand Tally falls "short" of the First "short-Win" Number, "Push" Number and/or "Mercy" Number being used, such hand(s) are "Sacked" and lose. Player(s) are also "Busted" over 21.

BLACKJACK / PROPOSITIONS

CROSS-REFERENCE TO RELATED APPLICATION

This application is a Continuation-in-part of Ser. No. 12/798,864, filed; 13 Apr. 2010, now; U.S. Pat. No. 8,308, 540.

FIELD OF INVENTION

This invention relates to games of chance as historically identified with wagering in casinos.

The Applicants' methods and modifications are inclusive to both a variety of live action table gaming formats as well as electronic display applications for play of all types. Their inventive process utilizes at least one common deck of fifty-two (52) playing cards or modified decks, such as a "Spanish deck," and/or their electronic simulation of the same which will still function for the Applicants' purposes.

Presently, the Applicants know of no previously established methodologies regarding either "live action" table game embodiments of Blackjack including those banked by a House (casino) or electronic "virtual reality" display methods of Blackjack/21 either with or without Dealers, which are presently under patent enforcement or otherwise that might be construed as teaching on or reading upon their concepts and process of play.

DESCRIPTION OF PRIOR ART

Blackjack is a premier table game in American casinos as well as casinos across the world. No doubt there is good reason for this. America and the world love card games and they know this game, Blackjack! Actually, it's a love/hate relationship; just ask anyone who plays the game. People love to play Blackjack especially when the cards give and of course take. However, before the disclosure of the Applicants' alternative methodologies, a brief discussion regarding Blackjack's traditional play along with some terminology and historical factors are useful in teaching the Applicants' inventive process as described and illustrated further below.

Simply put, the objective in traditional Blackjack is to beat the Dealer's hand. This is accomplished by having a totality of cards that tally higher than the Dealer's cards without going over Twenty-one (21). The card values in Blackjack are as follows: cards Two (2) through Ten (10) are tallied at face value while "face cards" are valued at Ten (10) and Aces are valued at Eleven (11) or One (1). Likewise, from here forward, the term "Ten card" will define both Ten (10) cards and/or Jack, Queen & King cards (a.k.a., Court cards).

Similarly, a "Blackjack" hand is always made up of the first two-cards dealt. These cards being a Ten card and an Ace. The Blackjack hand is also referred to as a "Natural" or when made with Three (3) or more cards, a "21" and is just as generally unbeatable.

Although, the dirty fact of the game is that a Dealer's dealt Blackjack hand will frequently drive a simultaneously dealt Player's Blackjack hand into an even money decision or, at the very least, a "Push stand-off" outcome for the Player's Blackjack hand, meaning the Player's hand doesn't win or lose. Likewise, a Dealer hand 21 made with three (3) or more cards always Push all other Player hand 21's made with three (3) or more cards as well. As a practical matter, a Player can win with any total under 21 so long as the Dealer either "Busts" first or the Player's hand count(s) finish higher.

Busting in Blackjack is any final tally higher than Twenty-One (21) for either the Player's or the Dealer's hand. But unlike the Dealer, Players will experience the "Double Bust." The Double Bust occurs when Players Bust-out first, followed by the Dealer Busting.

It is this constant reality of the Double Bust, which Players are intractably facing in Blackjack that gives the casino its greatest most frequently exercised "House Percentage Advantage" (a.k.a., Vigorish or "Vig.") over the Players. It is said that the Dealer will Bust 28% of the time however, only the Players can experience the Double Bust, because the Player must act first!

All things considered, Double Busting provides the House with a constant 5.7% advantage over the Players when Double Busting occurs. Therefore, any way you play it within the confines of all traditional Dealer hand methods and rules for playing Blackjack, there remains a powerful House advantage being exacted against all Players within the traditional rules of Blackjack, which must be constantly evaded. This House advantage is the Double Bust effect.

Additional aspects of traditional Blackjack play include the terminology of "Hard," "Stiff," "Soft" and "Pat" hands. A Hard hand is one that either does not have an Ace: 9-7/16 or if it does, it tallies as a One (1): 9-6-A/16. Typically, the Hard-hand totals of Twelve (12) to Sixteen (16) are also called Stiff hands because such hands can easily Bust when drawing additional cards.

A Soft hand is one that has an Ace being tallied as Eleven (11) amongst the first Two (2) cards being dealt: A-6/17, A-7/18, A-8/19 or A-9/20. Regardless whether the Player's hand stands made upon a Hard or Soft 17, 18, 19 or 20, such hands are thought of as Pat hands.

The last two general strategies of traditional Blackjack play include card "Splitting" and/or "Doubling Down," both practices of which Players are well advised to partake of, though tableside restrictions will vary from House to House. Most often when Players engage the practice of card Splitting & Doubling down, the decision is simply weighed against the Dealer's "up-card". Should the Dealer's up-card be a Bust card; 2, 3, 4, 5 or 6, this often inclines the Player to Split their paired cards, such as; 2's, 3's, 4's,-6's, 7's, 8's, 9's or Aces when they otherwise may not.

This scenario facilitates a great Splitting opportunity or better yet, as paired Aces reveal, a fantastic multiple Double Down action against a Dealer's weak up-card, although Players may draw out as many cards as necessary in a normal card Splitting situation until they either Stand Pat or Bust! Similarly when Splitting Aces, many casinos allow only one (1) card for each Split Ace.

In further regard to Doubling Down, again it's a good idea to Double Down whenever the opportunity arises, although Doubling Down is sometimes restricted to a Player's first two (2) cards tallying ten (10) or eleven (11) only.

Moreover, several restrictive rules pertaining to Splitting & Doubling Down, are put into place by Housemasters (casino management) as a means to maintain "a desired core operating margin position" for their Blackjack games, therein benefiting their casinos. Therefore, these rules will vary based on subserviently subjective factors. Additional subservient factors are found within the "Insurance & Surrender" rules as historically applied.

Traditionally, Insurance is offered when the Dealer's up-card is an Ace. For the unwashed, Insurance is generally thought of as a "bad bet," but does protect the Player's wager in the event the Dealer has Blackjack with a Ten hole card. As for the traditional practice of the Surrender rule option (either early or late Surrender and where it is still found), this rule enables the Players to withdraw from the hand for half the original contract wager. This action is taken by Player(s) when it's felt the Dealer's hand is so strong (often repeating up-card Tens & Aces) that keeping half the original contract wager is clearly better than losing all of it.

In America today and throughout the world, Insurance is readily found as part of the Blackjack gaming scene where Surrender rules are not so readily found outside of Asia and Europe. The reasons are simple. Insurance is generally thought of as a bad wager for Players to engage in, while Surrendering against continually "strong" Dealer hand up-cards is in a few cases, a good idea.

Of course, the Surrender action as historically deployed assumes the Player is not motivated to just simply get up and leave . . . .

The above background rendering of traditional Blackjack rule play pretty much covers all the essential bases of Blackjack play, however certainly not all the "Basics" of Blackjack play. As such, the Applicants' are referring to the qualities of play employed through the application of competent "Basic Strategy" play and the much more elusive "Advanced Strategy" play. Additionally within the bounds of traditional Blackjack's Basic Strategy, as written about in so many books on topic, there lies a most critical body of knowledge for which the Player must acquire an a fortiori logic to win. This competency of logic is regarding the speculative business of card counting as well as a cultivated knowledge of why & when to execute play action Ante wager Side-bets that can also prove constructive in the acquisition of more winning sessions rather than losing sessions at Blackjack.

The public's interest in card counting as an applicable skill is a natural consequence of having so many truly well rounded Basic Strategy Players at large. Moreover, this encroaching advance against the rather thin House advantage of the traditional Blackjack game via the art of card counting, as spurred on through strong Basic Strategy knowledge, has become so pervasive in recent years that now every on-looking Basic Strategy Player and Basic Strategy want-to-be-Player around, especially the mediocre ones, think becoming an Advanced Strategy Player (which is what an effective card counter is) is the next even axiomatic step of natural progression. Wrong, it's not! And, it's not about just reading a few more books either . . . .

Truly effective Advanced Strategy play is very rare and represents a fundamentally unique set of highly massaged skills. Such skills demand the pre-requisite ability to accurately count down a deck of cards in less than 30 seconds, for at least 45 minutes at a time, and that's just for starters. A simultaneous presence of mind capable of properly advancing a preplanned bet spread, as their "True count conversion" opportunities demand is also required. And then, there's the application of the correct "Key Strategy Assumptions" of which it is said there are 18 structured decision choices to be applied. And, all this represents a multi-layered calculus of reflexive on demand decisions to be assessed in addition to simultaneously perfect execution of Basic Strategy play.

Oh, and all this is assessed and applied on average in less than 20 seconds of a turn at play by this very rare Advanced Strategy card counting Master-mind at play . . . No problem, right?

Then there is this little issue of finding Single, even Double Deck games that do not engage a 6 to 5 payoff on Blackjacks. These games you must steer well clear of, and what a coincidence, it just so happens that a huge number of "single deck" games now pay this paltry 6 to 5 payoff while offering no other wagering recourses (incentives) to execute upon during play action.

So suffice-it-to-say, "card counters" generally speaking pose no particular threat!

In Las Vegas and around the country, many casinos offer, under the guise of Single Deck action, a number of 6 to 5 games on their casino's floors (i.e., Natural Blackjack payoffs being paid at: 6 to 5 over the traditional Blackjack pay off of: 3 to 2). A single act by Housemasters (that alone) makes beating the House in Blackjack even by a "Ken Uston," were he still alive, all but impossible. This "cynical" Blackjack payoff trend adds another 1.40% in the margin to the House's Vig-advantage where Players actually play and tolerate this.

Worse yet, this surreptitiously defensive trend is still spreading and, as advertised, has proven extremely disadvantageous to both the "stout" Blackjack Players and the more profligate too-smart-by-half type weekend Players alike who prefer Single or Double Deck play action!

Similarly, it's been observed that for the stout Blackjack Player the main purpose for acquiring the skill and confidence that card counting promises is to know when to "hit" to improve a Stiff hand or better yet, to "pitch" the Dealer Bust cards.

Although for the largely reckless card counter, what card counting is probably best suited for is, avoiding the dreaded Double Bust effect as well as evaluating both Insurance plays and Surrendering, wherever allowed and whenever it's wise. The fact is these skills alone will save "profligate" weekend Players a bundle against a casino full of scorching hot Dealers! Consequently, for the ten, or possibly twenty Advanced Strategy Players alive in the world today, high stakes private games are the alternative, which are often negotiated. As such, these "Freeze-out" games (a.k.a., Freeze games) are where the truly Advanced Strategy Players are typically revealed.

In this situation, the House is assuming such a Player is a card counting professional and enters such a Freeze game scenario with their eyes wide open . . . . Moreover, from the Player's standpoint, this scenario assumes the Advanced Strategy Player's mental acuity will remain sharp enough for a long enough session of time to get through the prearranged dollar figure draw across the table (usually 6, 7 or even 8 figure sums of money).

In the end, the edge that quality card counting provides is that minds-eye intuitive impetus to "make the play," and for this aforementioned very rare breed of gambler, that strong pulling back counter intuitive perspective that can effectively guess with 20/20 hindsight! However, significant danger lies within the collateral effects of card counting.

Such advantages being sought are summarily undone when either Basic or Advanced Strategy Player mishaps occur . . . . Typically, impacting somewhere up to 0.75% in the marginal advantage being sought depending upon their frequency, and whereby the Player's entire count effort will likely be made in vain.

As for the House's Vig-advantage in the game, most Blackjack games not allowing Surrender enjoy only a scant 0.60% edge on average; although, 0.60% as a common average is enough for the House to make a profit in most operating circumstances. However, this confined margin reality (House percentage edge) provides little from which to innovate with, which is another admission as to just how remarkable this application's "parent" disclosure is, particularly in view of what it accomplishes; meaning there is a proprietary component of the parental disclosure for which the Applicants' have now statistically discovered can also be "effectively grafted into the margin mathematics of "Dealer Hand Blackjack" through this new model's "Alternative Strategy play and Secondary Decisions process," as illustrated within their newest disclosure being discussed below.

Therefore, in pursuit of such ends, what we are left to start with, from one historical extreme, is an extraordinarily thin margin variance, which already means; the Applicants orchestration's to create and implement alternative rule play modifications, along with all their practical and pertinent benefits can not, and must not further "thin down the game's margins." While at the same time, the Applicants rule changes must not "bloat-up the game's margins either" to where players simply cannot win . . . Players & Housemasters alike will resist a Vig-advantage >3%.

BRIEF SUMMARY OF THE INVENTION

As will become quite clear, the Applicants' are proffering a "new play action model" for Blackjack. Likewise, in addition to the ongoing classic Blackjack play action, the Applicants' process allows for tremendous new advantage options; including uncommon "Triple Down" plays and a true to form "Parlay Blackjack" event, all having about the same degree of calculated risk as the historical Double Down wager does, while providing that extra, even extravagant, degree of high stakes excitement!

The Applicants introduction of this new Propositions class of wager arises out of the disclosure from the parent file of record and although, similar in function, this disclosure reinvigorates "Dealer Hand Blackjack" in a major way, with new unforeseen advantages now being projected into the traditional game. As will be further developed & discussed, this class of wager will pay out as "Do or Die to win" play action events.

By definition, this means this is not a Side-bet, nor is there a "must have" Ante wager dynamic required here either. Also, the creative application of "Short-win" and/or "Push/Tie" numbers ranging from seventeen (17) to nineteen (19) are optional agents to this Propositions' class of wager too; meaning upon a Player's Short-win, "less than a 100% payoff is made," while a Push, is a "Tie." Further still, the application of "Mercy" number(s) wherein "taking of a portion" of the Player's wager upon standing hand counts of seventeen (17), eighteen (18) and nineteen (19) is also, in reference for application here.

These optional components as engaged are coalescing agents for ameliorating exposure to the Propositions' intensified play action. These Short-win, Push & Mercy number components can be applied individually or as operational set(s) of numbers in direct play action support of the Propositions' winning numbers of Twenty (20) & Twenty-one (21). Moreover, with or without an Ante wager requirement being applied either prior-to play, or a commission percentage being applied to winning wagers post-up to the hand's completion in play, or whether optional Short-win, Push/Tie and/or Mercy number(s) are coalescing components working as a "means for ameliorating a player's exposure to risk in play," the Propositions' class of wagers remains uniquely advantageous for the Housemasters and Players of the Applicants' modified play action process moving forward.

How? Players simply elect to move into this Propositions' class of wager as they are presented with good opportunities to do so and then continue to draw through a flow of cards from either real or simulated deck(s) or shoe(s) of cards for their required outcomes to "win," assuming of course, Players are not Busted or Sacked, shown some Mercy by losing only a portion of their wager(s) experiencing a Push/Tie hand, or even catching a Short-win play along the way.

However, unlike the traditional game of Blackjack as historically deployed, the Applicants' Propositions establish a simultaneously accessible "parallel play action dynamic," best described as an "Alternative Bypassing Strategy" for play; although being more broadly designated as "Secondary Decisions." This Alternative Bypassing Strategy represents a fork in the road of play so to speak, a routing selection, a choice Player's have option to make while executing their play.

The Applicants' methodology "adds" this important new elemental strategy for play action and wagering to the existing menu of "prevailing risk" already being projected out from the traditional game's adversarial process.

It is through the confluence of the "Primary Base" play, and the prompting of the Secondary Decisions process, that Players now have clear alternative strategies for bypassing play against the Dealer's hand in action. Typically, the Primary & Secondary Base play action whereby players draw card(s) to "beat" the Dealer's final hand count, vs. the various Secondary Decision-Propositions play options being played out via the player's final standing hand count(s), as compared to applicable pay tables of consequence, is what actualizes this "fork in the road" for Players.

For example, as the Player contemplates the booking of an alternate Propositions wager, the Player may also enjoy a simultaneous option to initiate a possible secondary Double Down play against a Dealer's perceived weak up-card too, initiating first as a primary Base play action, then transitioning to a secondary Base play action, just as would be customary within the primary & secondary Base play of any traditional game's adversarial process against the Dealer's hand in play.

Conversely, the Applicants' Propositions play option(s) bear a uniquely distinctive characteristic in that any Player(s) after simultaneously evaluating the Dealer's up-card and then their own first two (2) cards for general advantage, including Split-hand or Third-card drawing opportunities, can forgo (bypass) play against the Dealer's hand to then rebook into this Alternative Secondary Decision's choice of wagering opportunities. In many circumstances, Players will take the option to Double or Triple Down if not, for example, book wager(s) for many times the original contracted amount (assuming the House allows it), and that is with or without a winner's commission being applied to such wagers.

Indeed, many Players will bypass traditional play, even Double Down play method(s), to opt-into such a Propositions: 20 & 21 play action especially since 20 & 21 are both winning outcomes for the Player, while Players may also be offered Short-win, or Push number(s), and/or a mix of Mercy number(s), like seventeen (17), eighteen (18) or nineteen (19), as aforementioned.

The magic of this Propositions: 20 & 21 wager, as initially disclosed within this application's parent disclosure was not mathematically visible until the know how of having No Dealer Hand at play was resolved. Similarly, as is the case herein, the entrance of the Alternative Bypass Secondary Decisions-Propositions: 20 & 21 class of wager bypassing play action against the Dealer's hand count, as now being cast into the traditional game of Blackjack by the Applicants, has also proven to be a rather fortuitous event here as well.

Why? First of all, unlike the parent case to this application, no other entity that the Applicants know of has, to date, ever made the Blackjack game function in play without a Dealer's hand. Moreover, without that discovery coming first, the concept of the Alternative Bypass Strategy and Secondary Decisions-Propositions: 20 & 21 class of wagers, both with and without the optional Short-win, Push and/or Mercy number(s) as well as other tricks would never have had cause to be revealed to them for this model's methods either. Secondly, to the Applicants' knowledge, no other source has ever suggested the importation of such a Secondary Decision's-Propositions class of wagers, as being introduced through an Alternative Bypass Strategy and routing process for the traditional game, much less illustrate the means by which this class of wager would function and flourish within the thin margin mathematics of the traditional play action environment.

OBJECTIVES AND ADVANTAGES

Therefore in reprise, traditional Blackjack is the most quintessential table game encompassing the psyche of the world's casino going experience. This is true even if you don't play the game. Almost nowhere will you go into a casino and not find Blackjack front and center to the table gaming play action! Accordingly, several objectives and advantages are clearly achieved by way of the Applicants' applied methodology model(s) having this new alternative class of high stakes Secondary Decision's-Proposition wager(s) coalescing onto the center stage of Blackjack's classic play action.

For example, as is the case with the customary procedure for Doubling Down, Player's are faced with significant consequences when booking into this tacitly "8 to 5" probability assumption/equation followed up by the "2 to 1" probability against drawing the typically sought after Ten-card(s) needed for winning this wager when drawing upon all types of ten & eleven count hands.

Why? First, if we are to accept the notion that essentially no one who is contemplating a traditional Double Down action is playing for less than an outcome of twenty (20) and preferably an outcome of twenty-one (21), which is a "rather universal truth" about taking such an action, then we can begin to see the equation take shape. Simply, there are thirteen (13) cards in a suit.

And second, as the Player sits with a one, two or perhaps, even more than a two-card ten (10) or eleven (11) count hand looking to achieve an outcome of twenty (20) or twenty-one (21) with their very next card, there lies five (5) ways to acquire either outcome drawing from a ten (10) count tally, that being a 10, J, Q, K & Ace. And, similarly, from the eleven (11) count tally, a 9, 10, J, Q & K does the job. Also, when Splitting paired Ten-cards & Aces or even Ace-Ten combinations, "Ten-cards" are what's being sought! All the while, fighting eight (8) ways of missing such outcomes, which are all other cards. Voila! The fundamental "8 to 5" equation appears.

Now that a fundamental understanding of the modus vivendi of the bypassing, Secondary Decision process for the Propositions class of wagers is established, a review of the modus operandi illustrating the way the wager will actually function during the play action of the game is useful. Therefore, with the booking of a contract wager, all Players are dealt two (2) cards up or down while the Dealer receives one card up, and one card down. Then starting with the person sitting at first base on the table, each Player seeing the value of their present two (2) card tally, along with the Dealer's up-card, have fast decisions to make.

Do they "Surrender," "Draw" card(s), "Stand Pat," "Double Down" and/or "Split" their cards, including Splitting their cards for Double Down play action(s) against the Dealer's possible final standing hand count? All of these options begin as primary Base then frequently advance, into secondary Base play action(s), as being repeatedly developed & discussed herein.

Or, if perceived achievable, do Players assume the different calculated risk of the Alternative Bypass Strategy via the Secondary Decisions-Propositions model, be it for executing a "general advantage" by avoiding strong Dealer up-cards, or instead by Splitting-Hands, Multiplying-Down or even, Multi-Down plays on a Split multiple of hand(s) for their stand alone "No Dealer Hand involved" outcome actions? In actual play action, such Secondary Decisions-Proposition wagers move onto a Propositions' wagering area readily identifiable upon any game table layout offering this class of wager, whereby exposing their wager(s) and completed hand count tallies to a significantly greater risk & reward!

In play action, the Applicants' Propositions: 20 & 21 play option functions like this: The Player evaluates his hand's options for overall play. Once the Player concludes that the Propositions wager is the play to make, the movement of the Player's contract wager(s) actually occurs.

Next, the Dealer, in order of turn, then recognizes the Player's desire to bypass traditional play by re-routing and rebooking the Player's Propositions wager to then pursue this Player's action to completion prior to the Dealer revealing their own "Hole" card. Typically, Players may be initiating either a simple Hand-Splitting action, therein drawing-out many cards to acquire that 20 or 21 to win, or depending upon what the next "post-Split" card(s) are, a new ten or eleven count hand may now exist, whereby their hand's action could still materialize into a further Multi-Down action or as the Player may be initially pursuing, a Multi-Down action where the Player receives only one (1) card.

Similarly, the Player may be applying Split Aces & Ten cards 10, J, Q & K or even Ace-Ten, for a shot at Propositions: 20 & 21 play action where the Player receives only One (1) card as well. However, there are instances where a player would be compelled to move "any unrestricted card(s)" to play the Propositions in "a drawing march" to a 20, 21 or Bust. One of several circumstances is when a player draws less than seventeen (17) with the Dealer's up-card showing an "Ace" (without a Blackjack). The compelling strength of the Dealer's "soft-hand" is why the Propositions play is the option to take. Moreover, should the player enjoy exposure to Short-win, Push/Tie and/or Mercy number(s), this move to the Propositions is all the better.

Again, this process is repeated for each Player expecting to play and complete this class of wager BEFORE the Dealer reveals their "Hole" card, whereby the customary process for play action still remaining for those Players not engaged in their own alternative Propositions play action for the round are brought to a resolution through the "revealing" of the Dealer's "Hole" card followed by the traditional process and manner of play.

As a matter of procedure, this Propositions: 20 & 21 to win class of wager:

BEGINS & ENDS FOR THE PLAYER BEFORE THE DEALER REVEALS THEIR "HOLE" CARD. Likewise, as previously referred to, this action is for a Do or Die, 20 and/or 21 to win standing outcome, regardless of whether number(s) like 17, 18 or 19 are being offered as active Short-wins or Push numbers, and whether seventeen (17), eighteen (18) and nineteen (19) are being offered as an active means to deploy Mercy number(s) during such play actions either.

Therefore, this is the unexpected means by which the "totality of the Propositions wagering model" can become "effectively grafted into the traditional game's calculations without requiring a must have Ante wager being booked prior to play," or even some kind of commission being taken post-up from the player's action when winning this higher stakes event.

In a nutshell, the idea and application of the alternative Propositions play action is to accommodate the Applicants unique discovery for allowing Players to reach for the casino's "Chandeliers" as it were, when engaging their differing ten (10) & eleven (11) count hands, Parlaying Blackjack hands or as initiated from some kind of card Splitting opportunity. Likewise, Players can engage in alternative card drawing marches too, bypassing play against the Dealer for that 20 and/or 21 win! Also, as aforementioned, Splitting and Multiplying Down on Tens, Aces or even the Ace-Ten Parlay, comes into play here as well when drawing the one (1) card allowed for executing many of these play action(s) wherein the Player is typically hoping to redraw to at least a twenty (20) again, if not, a twenty-one (21) outright for payoff while enjoying no need to beat the Dealer's hand to boot!

Of course, this all assumes the Player is willing to withstand the elevated risk of getting Sacked, Busting or some fate in between as the circumstance may play out. Should a Player's first two cards tally to what are typically standing counts of twenty (20) or Blackjack (21), such Players would usually acquiesce for their likely won, or winning payoffs, whereby their hand(s) are over.

Accept that, with these hands, the Player is already half way to a strong Parlay play event enjoying a reasonable Multi-Down win expectation upon their cards; times 2, 3 or 4 hands, depending upon "active tableside Splitting rules" for their pre-Split circumstance. Surely, the Parlay Split of two-card Twenty's, or at least, Parlay Blackjack bonus plays, will become commonplace!

Most importantly, the thrilling notion of making Multi-Down Propositions plays for about the same "8 to 5" degree of risk vs. the similar "8 to 5" probability risk at hand for the standard Double Down play action against the Dealer's final hand count becomes an obvious one . . . .

As such, the Applicants' unique methodology model provides a "whole new" outlook directly supporting the aforementioned features and benefits from their core mathematical mechanics for play, while still providing for all the necessary elements of a sustainable addition to the classic Blackjack workhorse of which the public will enthusiastically embrace.

Furthermore, it is the principle objective of the present methodology model to provide a wholly new gaming process and dynamic, while requiring only routine mental focus to enjoy a seamlessly familiar playing experience.

It is another principle objective of the present methodology model to provide a wholly new paradigm of thought provoking play that competently coincides with accepted mathematical mechanics and procedures regarding applied probabilities of chance projecting from the applied integrated core resource of first the cards along with their shuffle mix dynamic, their play action distribution, and then their actual assimilating engagement during play action.

It is yet another principle objective of the present methodology model to provide for the additional proprietary adaptation of an Alternative Bypassing Propositions' play action event engulfing the outcomes of 20 & 21 to win, whereby this wager is booked and ensued to completion before revealing the Dealer's down or Hole card to such Players during the course of finalizing their hands.

It is yet another principle objective of the present methodology model to provide for the optional proprietary adaptation of a Short-win, and/or Push number for paying out less, and allowing for Ties, having hand counts of, all or any, seventeen (17), eighteen (18) or nineteen (19) being applied for concurrent play action within any Secondary Decision's-Propositions: 20 & 21 class of events, as a means to "ameliorate a degree of risk," whereby inducing a better Player participation for these otherwise Do or Die outcome events.

It is still yet another principle objective of the present methodology model to provide for the optional proprietary adaptation of additional Mercy number(s) for taking "only a portion" of the Player's total wager on final hand counts of, all or any, seventeen (17), eighteen (18) or nineteen (19) being applied for concurrent play action within any Secondary Decision-Propositions: 20 & 21 class of events for the purpose of "ameliorating a degree of risk," whereby inducing a better Player participation for these otherwise Do or Die outcome events.

It is still yet another principle objective of the present methodology model to provide for a proprietary adaptation allowing Players to actually move "any initially unrestricted card(s)" into the alternate Propositions play action, whereby Players can better execute the play of certain weak hands, via a card drawing march, into the possibility of a better outcome within the alternative Propositions play action over that of continually facing down a strong Dealer's hand.

It is still even another principle objective of the present methodology model to provide for a proprietary adaptation allowing Players to book any "Split-able cards" into two (2) simultaneously separate play actions wherefore, playing at least one (1) part of this Split-hand's play action against the Dealer's standing hand count while playing out the other part(s) of this Split-hand event's play action against the Propositions: 20 & 21 to win, play action pay table.

It is even another objective of the present methodology model to provide for the adaptation of general Blackjack rules that are inclusive to the totality of the Applicants' proprietary Propositions class of event(s), which induces riskier actions on the part of its players to make much larger wagers with greater frequency by focusing upon the additional Splitting of cards, including any pair of cards, Ten(s) & Aces, or Ace-Ten(s) combinations as Multi-Down wagering events for the purpose of drawing out much larger sums of money (potentially, many times the original contract wager) across the casino's tables as types of all-in-events or Parlay bonus plays.

It is even another objective of the present methodology model to provide for the adaptation of an optional Ante being allocated from Players prior to an action, or as an optional commissionable percentage being applied to winners in a post-up fashion, to further support the Housemasters needs when applying the Applicants' Propositions process for Blackjack.

Another consideration regarding the Applicants' Blackjack methodology model is to make their gaming modifications available for application into an encompassing array of electronic video display units and/or third party hand held wireless devices and the like (not shown).

DESCRIPTION OF DRAWINGS

The foregoing features, advantages and other objectives of the Applicants' methodologies and modifications will become even more clearly understood from the following flow of decision chart embodiments for progressive events as taken in conjunction with the accompanying "description of counsel" (rules and play options) encompassing any Table gaming and/or Electronic video or wireless gaming display apparatuses being applied for the same.

FIG. 6*a* Illustrates an exemplary counsel embodiment for play along with its play action(s) & payoffs.

FIG. 6*b* Illustrates the continuing counsel embodiment along with its play action(s) & payoffs.

FIG. 6*c* Illustrates the continuing counsel embodiment along with its play action(s) & payoffs.

A DETAILED DESCRIPTION OF AN EXEMPLARY EMBODIMENT

Figure 1:
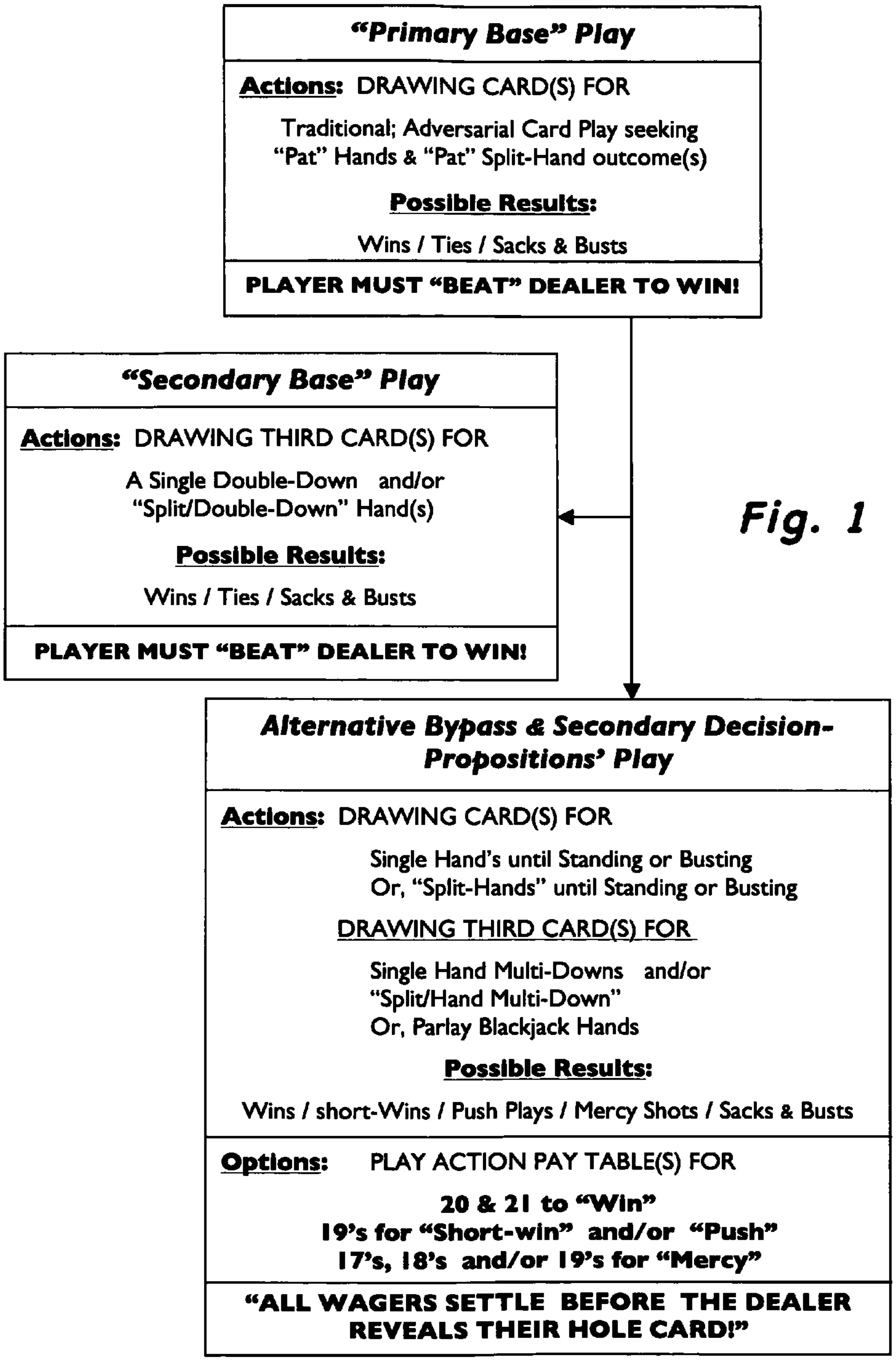
FIG. 1 Illustrates the collective primary and secondary decisions' play action option(s) for the game.

In referring to the drawings as illustrated, it shall be understood that the combined entities of FIGS. 1 through 6*c* inclusively, are exemplary embodiments of the Applicants' complete working Alternative Bypassing process & Secondary Decision's methodology model for Blackjack.

As such, the unique play action of the Applicants' Secondary Decision-Propositions: 20 & 21 class of wager's coalesces its influence through the core mathematical calculus of the traditional game; albeit the method and function of the Applicants' Propositions revelation is subject to a less calculating change process than the host of traditional co-active interactions (rules) being simultaneously made available for application within their model's traditional "Base rules" for play.

Therefore, the Base rules being applied upon the "traditional Blackjack aspects" of the Applicants overall play action models are subject to significant changes at the whim and purpose of the sponsoring organization (casino) with little effect upon various options as made available to its Alternative Propositions or Secondary Decision's class of wagers. This pertains to all traditional variations for Blackjack's play, which are well understood by all, as well as their established Vig-advantages for the house even as assigned on the fly of random algorithmic design by or for Housemasters.

Likewise, all methods & means for public access to the Applicants' Propositions: 20 & 21 wagering solution, inclusive too its optional Short-win, Push number(s) and/or optional Mercy number(s), be it through live action electronic video, wireless communications, mobile-internet devices or otherwise, represent the many anticipated deployment avenues for the adaptation of the Applicants' alternative bypass strategy model and wagering process into the traditional game of Blackjack. Therefore, upon the booking of a required minimum contract wager and any optional "Ante" wager side-bets being offered, a new hand begins with the acquisition of both the Player's and the Dealer's first two (2) cards. Next, each Player assesses their first two-cards to discover if a "Blackjack" has been dealt to them and, if so, does the Player wish to only receive their frequently guaranteed win payment and stop, or do they wish to make a "Parlay, Split & Increase" for what then will become two (2) new hands, thereby redrawing for each of the now Ace & Ten card hands, as clearly defined and illustrated in both FIGS. 2*b* & 5*b*, respectively.

Figure 2A:
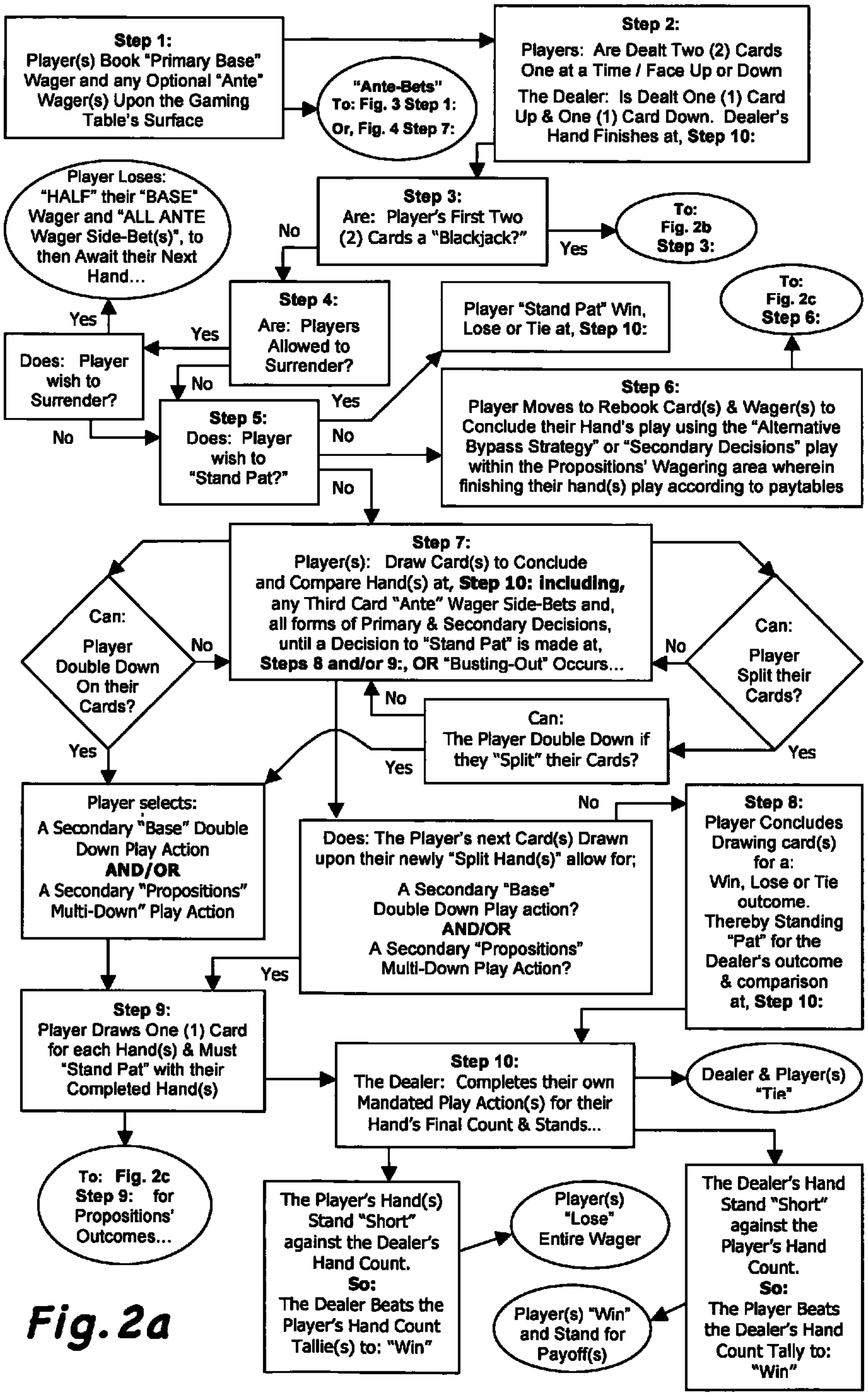
FIG. 2*a* Illustrates the general flow of progressive event/decisions to complete a round of play.
Figure 2B:
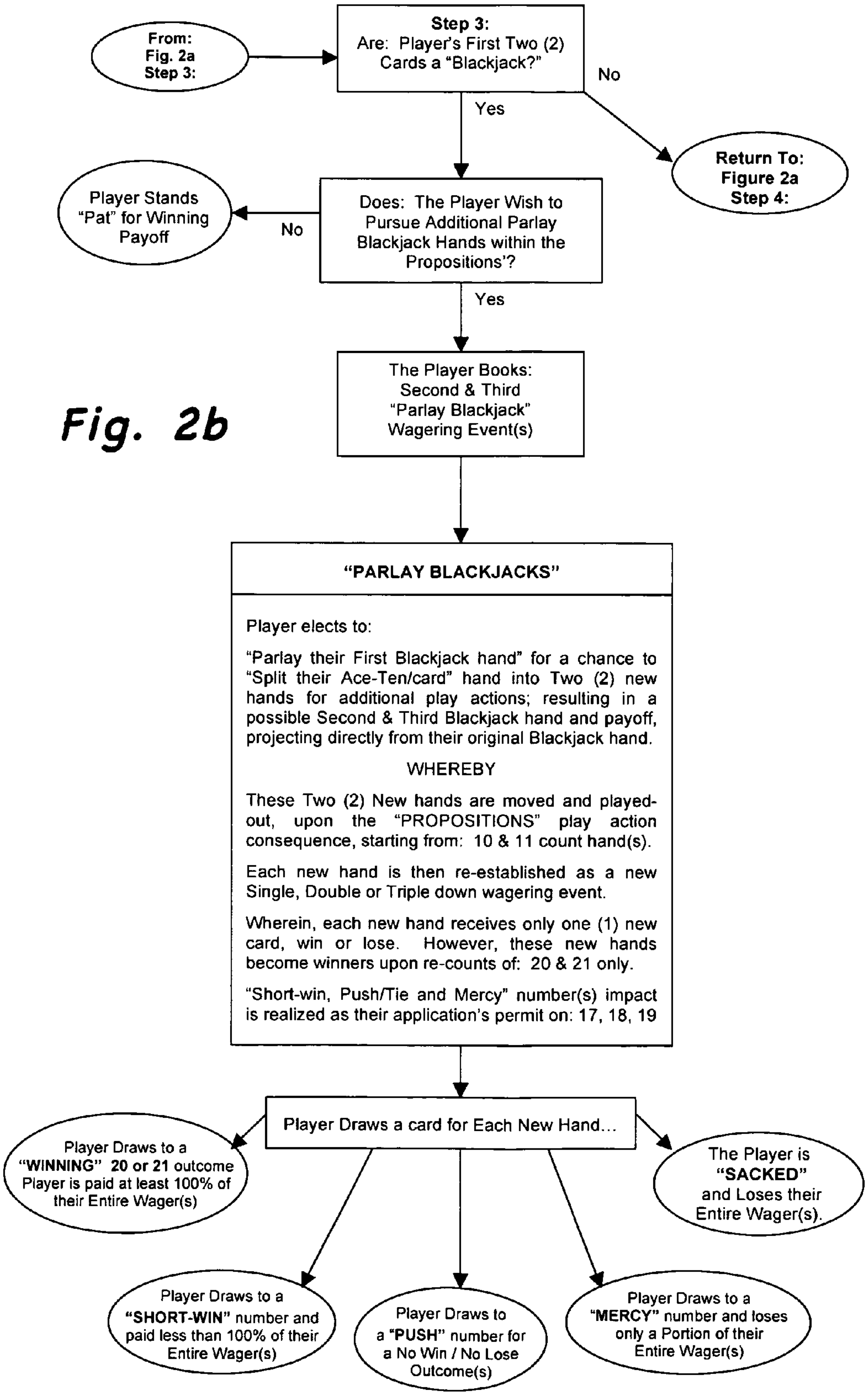
FIG. 2*b* Illustrates the continuing flow of progressive event/decisions to complete a round of play.
Figure 3:
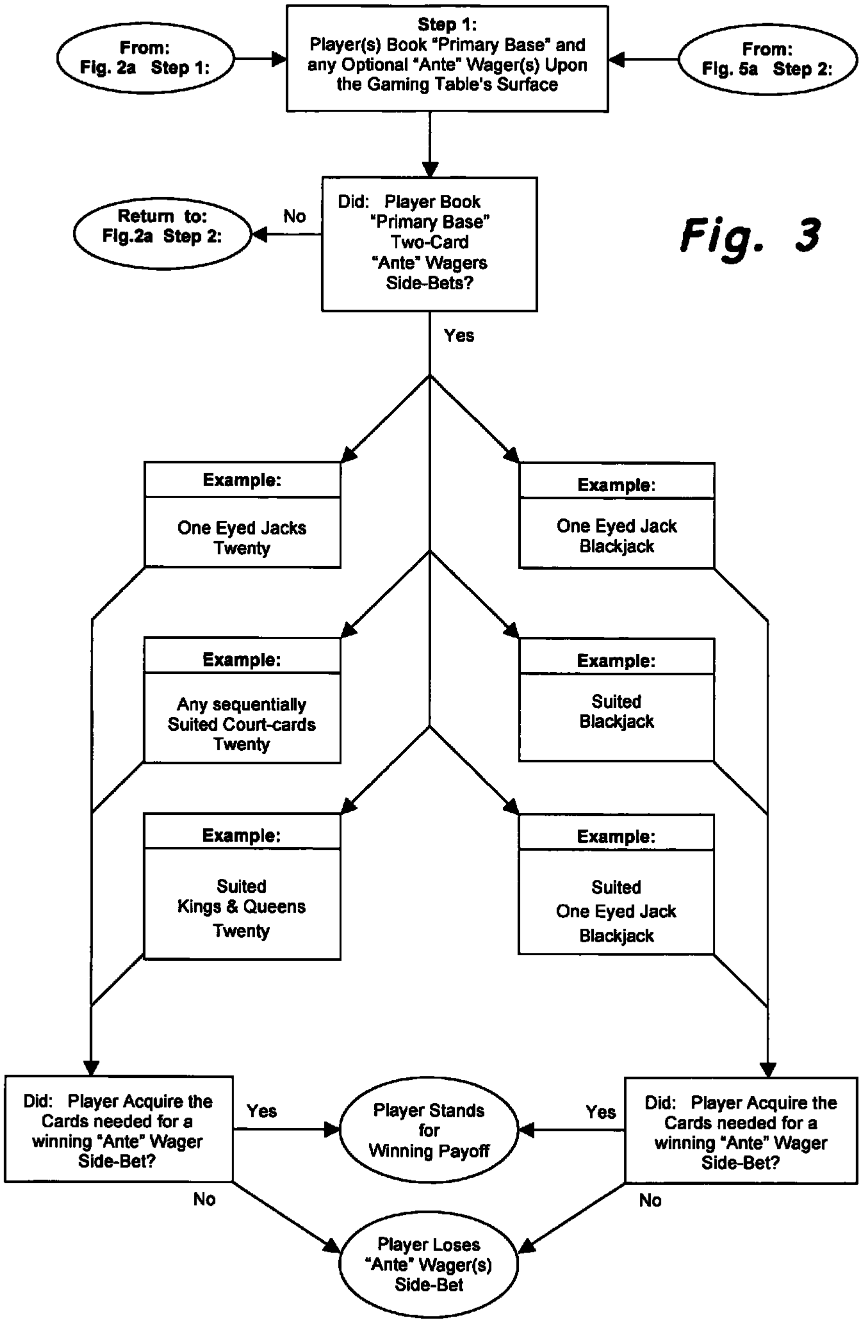
FIG. 3 Illustrates some options for a first, two (2) card ancillary "Ante" type side-bets.

Likewise, the Dealer & Player(s) evaluate if, any ancillary two-card winning hand tallies exist to include those of any two-card winning Ante wager side-bets having been made, as shown in FIG. 3. If not, then a decision to Surrender may be considered should that option be available to the Player, as illustrated in Step 4 and Step 5 of FIGS. 2*a* & 5*a* respectively.

In the absence of an immediate winning hand count tally outcome or a desire to Surrender their hand, Players will likely be compelled to draw at least one (1) card as to at least avoid being "Sacked" with a poor hand count. Historically, it has always been the Player's motivation to acquire a winning hand tally over the Dealer's hand, while drawing as few cards as possible, bypassing other play options to successfully engage a card drawing march without Busting to achieve such ends.

Whereas now, Players will have a "bypassing" option to move any unrestricted cards (cards of the Housemaster's prerogative) outright to the Propositions' for a direct "card drawing march" to a "win" upon a 20 or 21 outcome, as illustrated through FIGS. 1, 2*a*, 2*c*, & 5*a* 5*c*, in Toto.

Indeed, the general decision to draw card(s) can come with additional possibilities for Players either by Splitting any pair of equally valued cards, usually but not limited to Ten cards or Aces, Doubling Down on their cards assuming their cards and the Dealer's up-card warrants such an action, or both Splitting and Doubling Down against what should be a weak Dealer up-card. Similarly, if the Player feels compelled, they may well take a shot at the Alternative Bypass Strategy regarding Multi-Down play actions of the game's newly integrated Secondary Decisions-Propositions: 20 & 21 play options for many of these very same types of hands.

Figure 5A:
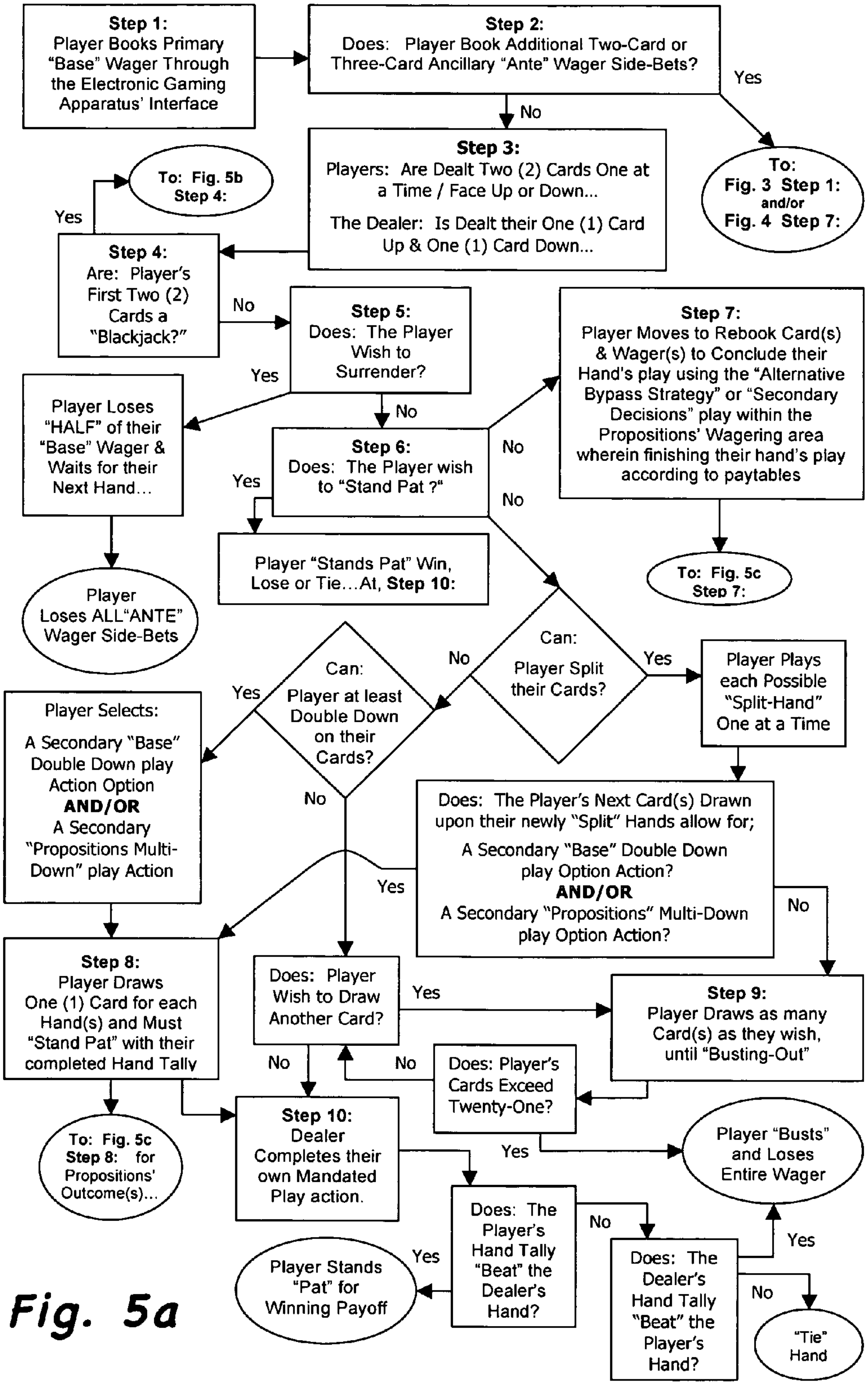
FIG. 5*a* Illustrates the general flow of progressive event/decisions to complete a round of play for an electronically programmable and/or wireless device application of the game.
Figure 5B:
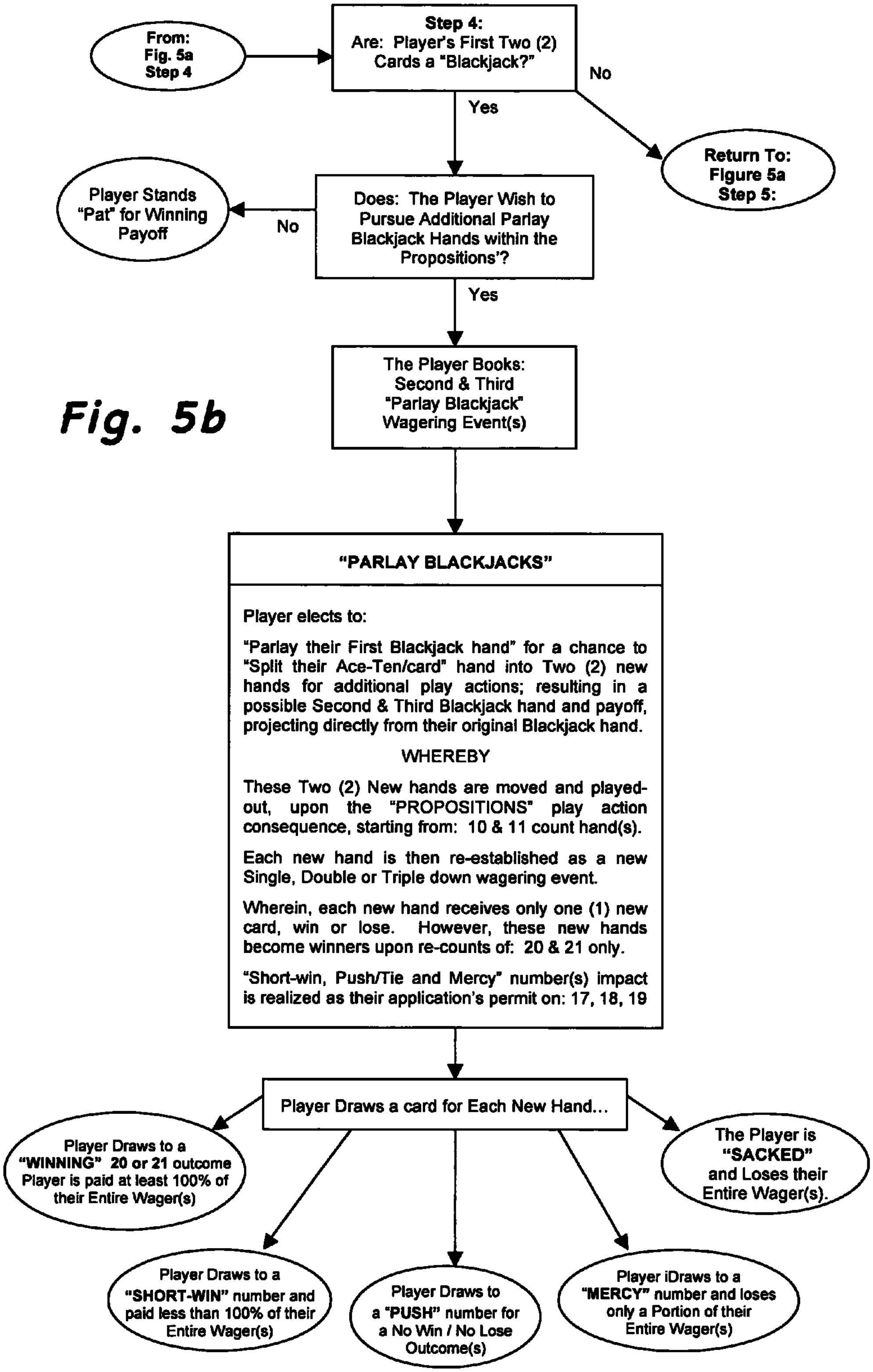
FIG. 5*b* Illustrates the continuing flow of progressive event/decisions to complete a round of play for an electronically programmable and/or wireless device application of the game.

FIGS. 1, 2*a* & 5*a* clearly show the flow of progressive events illustrating the Player's option to draw card(s) as they see fit without Busting, as well as the Player's incumbent need to "Stand Pat" if the Player draws for the one (1), and only one (1), card allowed for either an initial secondary Base Double-Down action(s) and/or Alternative Secondary Decision's Multi-Down Propositions play action(s) being offered.

Figure 4:
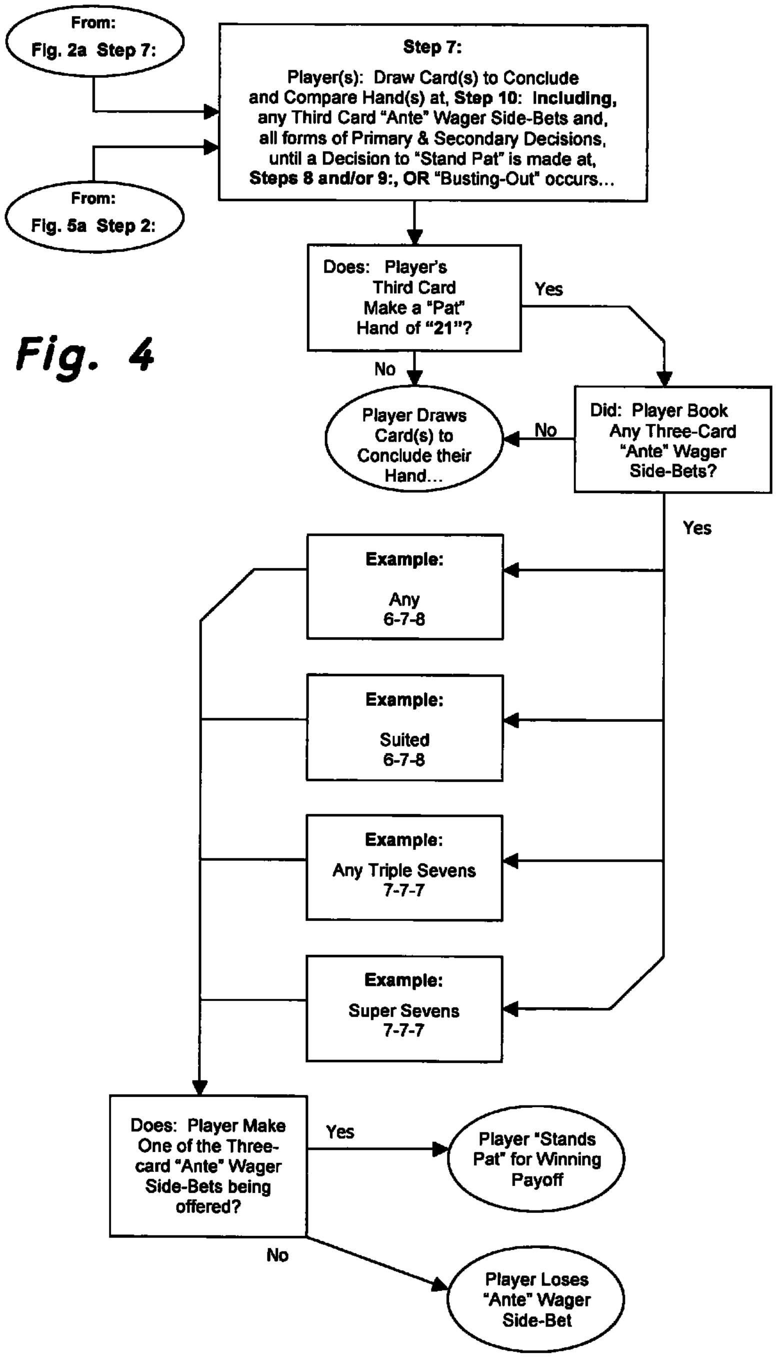
FIG. 4 Illustrates some options for a first, three (3) card ancillary "Ante" type side-bets.

Also, winning hand tallies show upon the deliberative draw of third-card play actions too, and can be inclusive of three-card ancillary Ante wager side-bets, assuming they were initially booked, as illustrated in Step 7 of FIG. 4. Consequently, FIGS. 2*a*, 2*c* & 5*a*, 5*c* also illustrate the consequences of not acquiring a winning hand.

As clearly affirmed, if a Player Stands Pat with a hand count "short" of the Dealer's hand count for any kind of play action(s) being played against the Dealer's hand count or as applied upon any number of Proposition play actions including all forms of card draws and Split-hand play where the Player's final hand tally falls "short" of twenty (20) or consequently the first or lowest Short-win, Push/Tie and/or Mercy number(s), numerically being applied, the Player's hand(s) are "Sacked" and they lose their entire contracted wager(s) as well as any ancillary Ante wager side-bets for the hand they may still have booked.

Figure 2C:
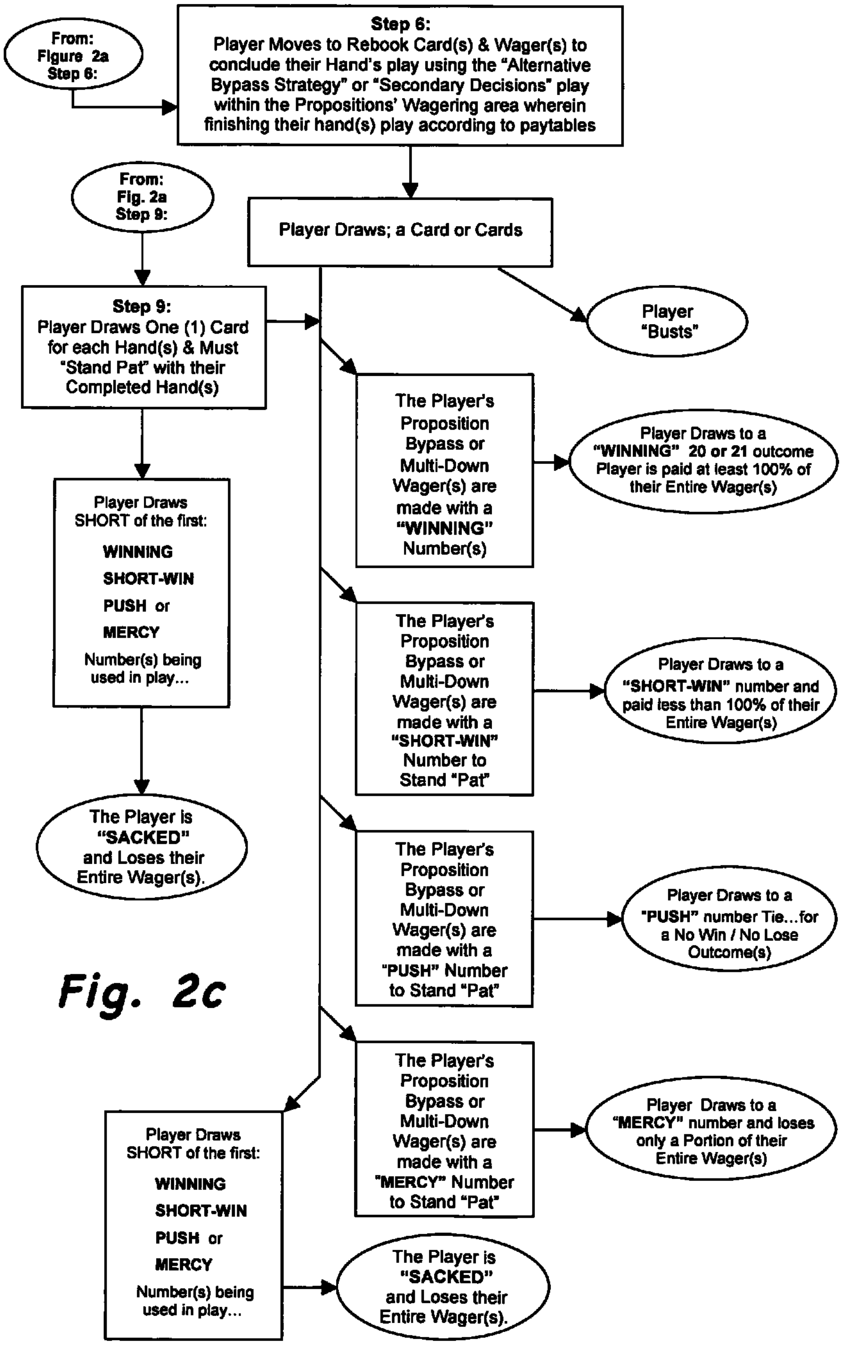
FIG. 2*c* Illustrates the continuing flow of progressive event/decisions to complete a round of play.
Figure 5C:
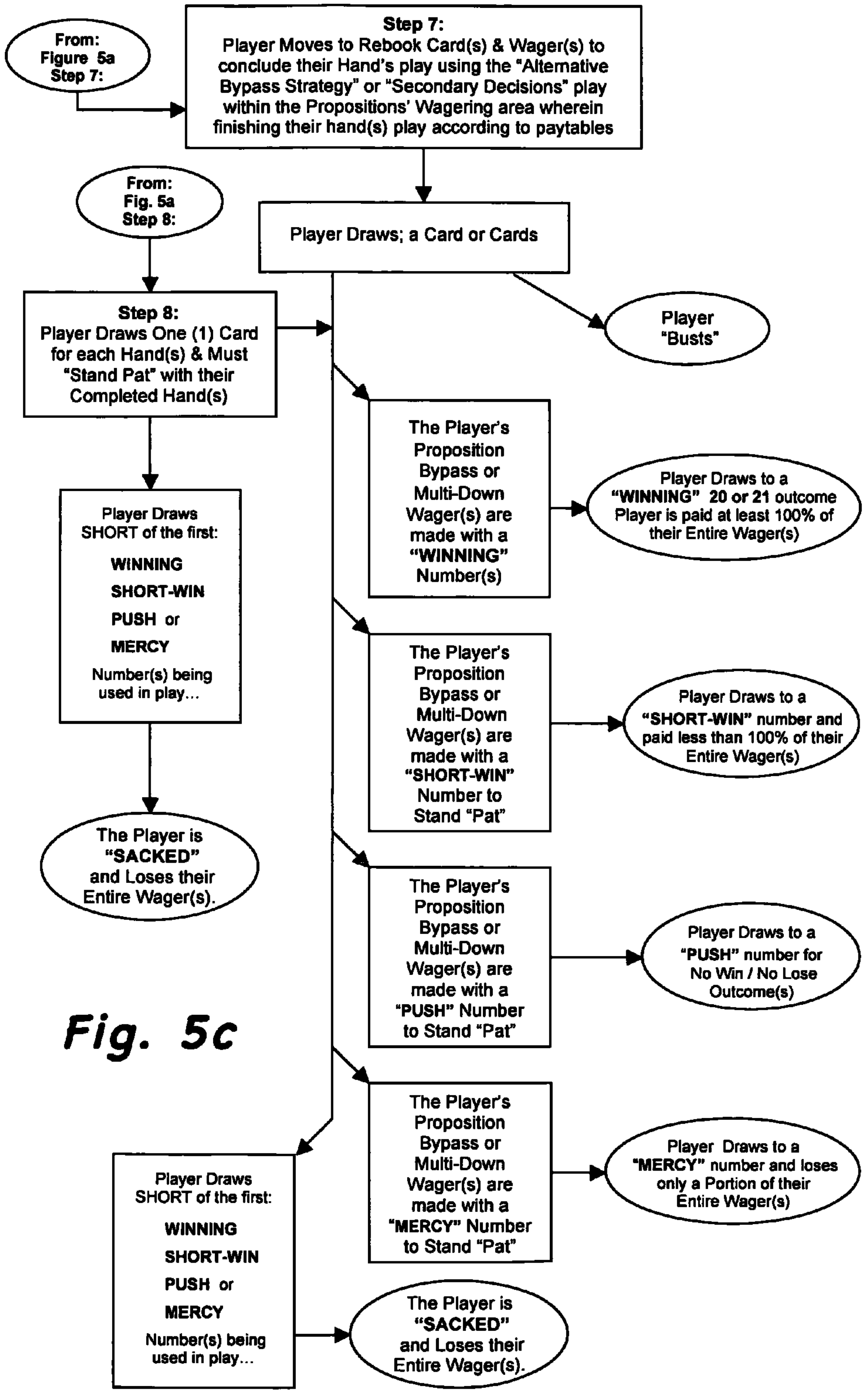
FIG. 5*c* Illustrates the continuing flow of progressive event/decisions to complete a round of play for an electronically programmable and/or wireless device application of the game.

Also, if in the process of playing out a Propositions wager, a Player Stands Pat upon a hand count of an optional Short-win, Push/Tie or Mercy number(s) as being applied, such a circumstance resolves the Player's hand count as either: a "Short-win," meaning their winning wager is paid less than a 100% payoff on the hand's cumulative total wager, or a "Push/Tie," meaning a no win no lose outcome, or as a "Mercy shot," meaning the player loses only a portion of their total wager for the hand, as Illustrated in FIGS. 2*c* & 5*c* respectively. Finally, FIG. 6 in Toto, provides an Exemplary Counsel Embodiment that unequivocally guides the Applicants intentions for general play action along with a complete play action digest of their Propositions: 20 & 21 adaptations.

OPERATIONAL ADVANTAGES

Suffice-it-to-say that until now, within the practiced bounds of Blackjack, no one has ever proffered to establish a class of wagers like the Applicants' Alternative Bypassing Secondary Decision's-Propositions class of high stakes wagers, whereby providing simultaneous advantage wins on both outcomes of 20 & 21.

Additionally, the application of optional short-Wins, Push-plays and/or Mercy shots for the outcome numbers of seventeen (17), eighteen (18) or nineteen (19) is also unknown to the game.

Not to mention, Players Splitting their hand(s), wherein having the simultaneous option(s) to play either a "No Dealer Hand involved" play action for their final outcome(s) of twenty (20) & twenty-one (21) to win, or the traditional playing of their hand(s) against the Dealer's final standing hand count tally for their possible play action win(s), or even again, taking on both types of play action(s) simultaneously and all the while, operating in association with the core calculus & formulations engaging the traditional game of Blackjack.

Neither have the Applicants ever personally heard of or read about the idea of, or even the mere suggestion of, applying such rules supporting such play within the bounds of Blackjack.

Additionally, such wagers are being revealed and promulgated by way of a new formulation & solution for Blackjack play action, which classic Dealer hand Blackjack methodologies have clearly never envisioned of prior to the Applicants' revelations.

Certainly, as also revealed for application herein, the Applicants' methodologies and modifications provide additional advantages through the encompassing means of interactive video gaming apparatuses as provided for the game, be they "wireless hand-held devices" or otherwise.

In considering the Applicants' modifications as applied to an electronic process for play, a broader scale of Player interactions being based upon the interactive platform and software of a "Host" apparatus can now allow for the significant variations of regulatory law coming into affect, including their operational environments of "broader mathematical opportunity" and the fact that in mobile wireless or video mode, the Applicants' gaming process is also engaged into a "real time computing environment." In this environment, the issuance of monetary units (i.e. credits) and their valuations are not as constricting upon the play-by-play action of the Applicants' process for play.

This means there are no human factors slowing the game to figure out what can now be a more sensitive fractional, even mill-age, addition or deduction to a Player's wager or payoff, when a decision to Stand Pat is made. Also, and no human mistakes in calculating them are possible either! Therefore, a perfectly worthwhile process for engaging the Applicants' gaming modifications to the public will be provided through the application of the "singularly intimate" means of an electronic video display apparatus, wireless telecommunications device or the like.

Another "value added" aspect of the video application process is the ability to string any number of video units and/or wireless hand held devices together for community play across any number of geographical localities throughout the world supporting any number of traditional Base and/or Propositions wagers, or ancillary Ante wager type Side-bets and/or batteries of progressive "jackpot" opportunities. And, if that's not enough, how about all tournament play possibilities!

As for the gaming industry, casinos can once again offer their patrons an exciting addition to traditional Blackjack that is simple to grasp and, at times, can prove to be even more generous to their patron's Time-In-Play.

And finally, the Applicants' process of play either in its table gaming format or its interactive electronic formats provide solutions that not only support richer incentives for a patron's play action, but indeed, the Applicants' methodology will very likely simultaneously propagate a significantly "fatter" Win-percentage value for Housemasters as well. This will be accomplished by drawing out much larger sums of capital across its play action environment(s) with greater ease in shorter spans of time.

From the Player's continuum perspective, the Applicants believe that given the totality of the featured Propositions' class of wager(s), along with their applicable alternative strategies as having been so thoroughly disclosed and discussed herein, there exists, just the right incentives necessary for reinvigorating the blackjack franchise, and maybe, proving to be a most timely vision . . . .

Accordingly, the present invention has been described with respect to specific methods & modifications, along with an effective counsel embodiment being shown. Likewise, it will be understood that various changes and further modifications will be suggested by those skilled in the art. Therefore, it is the intent of the Applicants' to anticipate such changes and modifications as falling within the scope of the appended claims.

We claim:

1. A method to proliferate a modified gaming process for playing blackjack utilizing at least one common or modified deck of cards for application to a wholly new alternative play action strategy and procedure, whereby directly benefiting housemasters and players thereof, comprising:

a modified gaming process for playing blackjack utilizing at least one common or modified deck of cards in play;

with, said gaming process having each player establish an initial base contract wager to play the game;

and, said process having a player's hand, and a dealer's adversarial hand, being dealt;

said each player receiving an initial two-cards up or down, to establish an initial two-card hand-count of up to twenty-one for play action;

along with said dealer receiving an initial two-cards, one as an up-card, and one as a down facing hole-card, that establishes said dealer's initial adversarial hand-count at play for the round;

awarding all initial two-card winning blackjacks, and side-bet hand-count tallies according to prevailing rules for payoffs;

prompting said players to then assess their own initial two-cards, simultaneously along with said dealer's up-card to evaluate and pursue a solution for general advantage, aimed at continuing play against said dealer's hand, or to move to bypass said continuing play against said dealer's hand;

providing said players with a routing selection option for pursuit of said player's hand through the means of an alternative bypassing strategy for play action, being more broadly applied as a means to deploy a secondary decisions process, for offering said player thereof, a variety of wagering options during play, via the means of a propositions process for play, being opted into, prior to said player drawing any additional cards, whereby playing out said player's hand into said alternative bypassing strategy means for accessing said propositions process;

having all such play actions as associated with said alternative bypass strategy means for play, being accessed via the procedural processes of said propositions means for wagering, that begins and ends its play action thereof, for said players hand, before the dealer reveals said down facing hole-card to players at large, which further occurs during the traditional completion of said dealer's hand through each round of play;

also, said players may inherently opt into assessing their own said initial two-cards, simultaneously along with said dealer's up-card, for a decision to stand-pat, or to draw additional cards, to pursue a traditional primary or secondary base variety of play options, as to complete said player's hand, being played out against said dealer's final standing adversarial hand and outcome, for said round of play.

2. The method of claim 1, further includes a player's decision to play at least one, of their two initially dealt cards, via said alternative bypassing strategy means for wagers being rebooked, via the propositions play action, before said dealer's down facing hole-card is revealed, with said player's other card, playing via a variety of primary or secondary base play actions against said dealer's final hand-count, which concludes only after the revealing of said dealer's hole-card, during a round of play.

3. The method of claim 1, further includes said alternative bypassing strategy means for play that inclusively applies in action too any unrestricted two-card player hands and wagers, being re-routed and re-booked by said players thereof, prior to drawing additional cards for play into any secondary decisions process results, via the proposition pay tables, therein completing said player's hand during a round of play.

4. The method of claim 3, further includes said alternative bypassing strategy means for play, that inclusively deploys the means of an optional parlay, split and, or increase, replay process for playing the means of a parlay blackjack replay event, for a player's newly won hole-count blackjack hand, of a ten, and ace card thereof, being split into two new hands immediately accessible for replay starting as a ten, and eleven count hands, following the pay-off of said player's initial blackjack outcome, during said round of play.

5. A modified game of blackjack, initiating a wholly new play action procedure, being played upon an electronically programmable gaming apparatus displaying an electronic simulation of either a common or modified deck of playing cards for play of the same, whereby directly benefiting house-masters and players thereof, further comprising:

a modified game of blackjack, utilizing an electronically programmable gaming apparatus, for operating an electronic simulation and display, along with its communicative methods, allowing players thereof, to book and display initial base wagers, starting a new round of play, along with the utilization and display of at least one common or modified deck of cards, for showing a player's initial two-card hand, having a hand-count of up to twenty-one, while also showing, a dealer's initial two-card hand, exhibiting one card dealt up, with another card dealt down, having a hand-count of up to twenty-one, that establishes said dealer's adversarial hand in play;

means for playing said modified game of blackjack, via said electronically programmable gaming apparatus, having said players thereof, simultaneously assessing their own said initial two-cards, along with said dealer's up-card to evaluate and pursue a plan of action solution designed for general advantage, aimed at either continuing play against said dealer's hand, or to move to bypass said continuing play against said dealer's hand, at which time, allowing for a re-routing and rebooking, of said initial base wagers into the means of an alternative bypassing strategy action, being specifically intended, for executing just such a move to bypass said continuing play against said dealer's adversarial hand, whereby all such procedure options initiate anew, through each successive round of play;

means for playing said modified game of blackjack, via said electronically programmable gaming apparatus, providing said players with an alternative strategy means for executing bypassing plays, being more broadly applied as a secondary decisions means for directly pursuing numerous alternative wagering options into the means of the propositions process, for said players thereof, all of which is being opted into, prior to said players drawing a third card;

means for applying play actions as initiated via said secondary decisions means for playing the procedural strategy processes of said alternative bypassing means for which, begins and ends its play action thereof, for said player's hand, before said dealer reveals said down facing hole-card to players at large, of which revelation, further occurs during the traditional completion of said dealer's hand for finishing said round of play;

means for analyzing said general advantage being aimed at continuing pursuit of said traditional primary or secondary base variety of play options, including a decision to stand-pat, or to draw additional cards, as then said player's hand is finalized, against said dealer's standing adversarial hand-count outcome, for said round of play;

means for playing said modified game of blackjack, via said electronically programmable gaming apparatus, settling all sacked hand counts, short of said dealer's final standing hand-count being applied, as a complete loss, for said player, while settling all player busting hand-counts drawn over twenty-one, as wins for the house.

6. The apparatus of claim 5, further comprising means for applying said secondary decisions means for inclusively providing a means of deploying an optional parlay, split and, or increase, wagering replay process, for engaging the means of a parlay blackjack replay event, for said players thereof, which occurs immediately after said winning hole-count blackjack hand is paid-off whereby providing a replay for said hole-count blackjack hand, via the reuse of the ten, and ace cards, that are optionally accessible for just such replay events, within the propositions, during said round of play.

7. The apparatus of claim 5, further comprising means for applying said propositions process means for which deploys an optionally applied, coalescing agency of mercy numbers, push numbers, short-win numbers and winning numbers working as a means to ameliorate risk exposure for extending said player's time-in-play, when standing-pat upon any such coalescing number agents thereof, as applied within the totality of the secondary decisions means for accessing said propositions process means for play actions, during said round of play.

8. The apparatus of claim 7, further comprising means for settling all sacked hand counts, numerically short of the lowest mercy, push, short-win or winning, coalescing number agents being applied, as losers for the player.

9. A method for a dealer, and players, to play a modified game of blackjack, engaging the use of at least one common or modified deck of cards, resulting in the provision of a wholly new alternative strategy and procedural methodology for play, directly benefiting housemasters and players thereof, comprising the steps of:

(a) allowing said players to make an initial primary base contact wager for play of said modified game of blackjack;

(b) allowing said players to make additional ancillary ante wager side-bets for play action;

(c) having said dealer of said modified game of blackjack, using either common or modified decks of cards, distributing to all players an initial two-card hole-count hand, facing up or down, of up to twenty-one;

(d) having said dealer of said modified game of blackjack, distributing the dealer's initial two-card hole-count hand, drawing one card up, and one card down, of up to twenty-one;

(e) opening play via traditional blackjack procedures and options, once a new round of play is initiated;

(f) settling all first two-card ancillary side-bets, and first two-card winning blackjack hand-counts according to predetermined house rules;

(g) prompting said players of said modified game of blackjack, to then assess their own initial two-cards, simultaneously along with the dealer's up-card to evaluate and pursue an analysis for general advantage, aimed at either continuing play against said dealer's hand, or to move to bypass said continuing play against said dealer's hand;

(h) providing said players with a routing selection option for pursuit of said player's hand through the means of an alternative bypassing strategy for play action, being opted into prior to said players drawing additional cards, whereby playing out said player's hand into the propositions play action processes;

(i) allowing for said players of said modified game of blackjack, pursuing access into said alternative bypassing means for application to any initially dealt unrestricted two-card hands entering action, via the means of a secondary decisions option for play into the means of the propositions process for said players thereof, in order to complete selected play actions, that both begin and end, before said dealer reveals said down facing hole-card to said players at large;

(j) providing said players of said modified game of blackjack, having access into said alternative bypassing means for allowing said players thereof, to draw out at least one additional card, to a point of standing-pat, even upon the means of a coalescing number agent used for applying mercy, push, or short-win outcomes, operating within one of the secondary decision-propositions' play actions, whereby ameliorating exposure to risk, when standing-pat upon any of the applied coalescing number agents, during said round;

(k) allowing said players of said modified game of blackjack, a decision to play at least one, of their two initially dealt cards, via said alternative bypassing means for wagers being rebooked, via said propositions' means for play, before said dealer's down facing hole-card is revealed, with said player's other card, playing via a variety of primary or secondary base play actions against said dealer's final hand-count, which concludes only after the revealing of said dealer's down facing hole-card, during a round of play;

(l) settling all winning secondary decision options for ancillary three-card ante wager side-bets, according to their predetermined pay tables, and rules for payoff;

(m) settling all said player hand-counts drawn over twenty-one, via said propositions process as a complete loss of said player's wagers during such play action for said round;

(n) allowing said players of said modified game of blackjack, without an initial first two-card winning hand-count, nor having taken up access to said alternative bypass means for said modified game of blackjack thereof, to further exercise the option to draw at least one additional card for initiating a variety of traditional primary or secondary base contract play actions for furthering the acquisition of a standing hand-count, of not more than twenty-one, being held by said players, that beats said dealer's final standing hand-count, during a round of adversarial play between said dealer's standing hand-count, and said players standing hand-count, when completing said round of play;

(o) settling all standing hand-counts of said players, having been booked upon said variety of traditional primary or secondary base contract wagers, with said wagers standing upon two or more cards, being concluded according to their outcome against said dealer's hand and outcome, as winners, losers or ties.

10. The method of claim 9, providing said players of said modified game of blackjack, having drawn said first two-card winning blackjack hand-count for said players thereof, step (f) further includes said players exercising an optional means to parlay, split and, or increase their contract wager during the replay process, for pursuing the means of a parlay blackjack event, for replay of the player's newly won hole-count blackjack hand, of a ten, and ace card thereof, being split into two new hands immediately accessible for said replay, as new ten, and eleven count hands, following the pay-off of said player's initial winning blackjack outcome, during said round.

11. The method of claim 10, providing said players of said modified of blackjack, having drawn said first two-card hole-count blackjack hand, to further act upon said parlay, split and, or increase means for allowing said players thereof, to at least re-wager up to triple their initial contracted amount being wagered, for either or both, new parlay replay bonus blackjack play actions.

12. The method of claim 9, providing said players of said modified game of blackjack, having access to said alternative bypassing strategy means for said players thereof, step (h) to further include, the ability to draw out at least one additional card for playing their hand, along with the additional option to increase the amount of any initial primary base wagers, having already been rerouted and rebooked, when moving into said propositions play upon any of said secondary decisions' options.

13. The method of claim 9, providing said players of said modified game of blackjack, allowing access to said alternative bypass strategy means for said players thereof, step (j) to further include, the ability to draw at least one additional card which may avoid said player's hand from standing-pat upon any of said coalescing number agents thereof, yet still allowing for said players, to acquire a winning hand of twenty or twenty-one, being realized during such play actions.

* * * * *